US008816963B2

(12) United States Patent
Tong et al.

(10) Patent No.: US 8,816,963 B2
(45) Date of Patent: Aug. 26, 2014

(54) OPTICAL NAVIGATION MODULE AND MOBILE ELECTRONIC APPLIANCE USING OPTICAL NAVIGATION MODULE

(75) Inventors: Tak Kit Dennis Tong, Hong Kong (HK); Wai Vincent Hung, Hong Kong (HK); Xiaoming Yvonne Yu, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 464 days.

(21) Appl. No.: 12/965,935

(22) Filed: Dec. 13, 2010

(65) Prior Publication Data

US 2012/0146948 A1 Jun. 14, 2012

(51) Int. Cl.
*G06F 3/042* (2006.01)
*G06F 3/0354* (2013.01)
(52) U.S. Cl.
CPC ............ *G06F 3/042* (2013.01); *G06F 3/03547* (2013.01)
USPC ............................. 345/166; 382/124; 250/221
(58) Field of Classification Search
CPC .... G06F 3/0317; G06F 3/0321; G06F 3/0325
USPC .......... 345/166, 156, 175; 382/124–127, 312; 250/221
See application file for complete search history.

(56) References Cited

U.S. PATENT DOCUMENTS

| 5,596,454 | A | * | 1/1997 | Hebert ........................ 382/124 |
| 7,138,620 | B2 | | 11/2006 | Trisnadi et al. |
| 7,158,659 | B2 | | 1/2007 | Baharav et al. |
| 7,164,782 | B2 | | 1/2007 | Baharav et al. |
| 7,274,808 | B2 | | 9/2007 | Baharav et al. |
| 7,671,859 | B2 | * | 3/2010 | Birman et al. |
| 2010/0078545 | A1 | | 4/2010 | Leong et al. |
| 2010/0302160 | A1 | * | 12/2010 | Reigneau ..................... 345/166 |
| 2010/0321152 | A1 | * | 12/2010 | Argudyaev et al. .......... 382/124 |
| 2011/0133941 | A1 | * | 6/2011 | Yao et al. ..................... 250/221 |

FOREIGN PATENT DOCUMENTS

CN 1881158 A 12/2006
JP 2010-165138 A 7/2010

OTHER PUBLICATIONS

1st Office Action of counterpart Chinese Patent Application No. 201110009129.5 issued on Mar. 27, 2014.

* cited by examiner

*Primary Examiner* — Regina Liang (57) ABSTRACT

An optical navigation module includes a light source, a light transmission window having a navigation surface, a first light shield configured for blocking the ambient light and absorbing the scattered light, a sensor configured for detecting light from the light transmission window and a second light shield located between the light source and the sensor and configured for blocking the direct light from the light source to the sensor. The light transmission window includes at least one refraction surface. The refraction surface is in the light path from the light source to the sensor.

39 Claims, 11 Drawing Sheets

OPTICAL NAVIGATION MODULE AND MOBILE ELECTRONIC APPLIANCE USING OPTICAL NAVIGATION MODULE

FIELD OF PATENT APPLICATION

The present application relates to an optical navigation module. The present application also relates to a mobile electronic appliance using an optical navigation module.

BACKGROUND

Optical navigation devices use a light source to illuminate a navigation surface so that an optical imager can generate digital images for computing motion. For example, an optical imager can image a finger on a surface and generate a navigation signal based on comparisons of sequential images. However, as the size of conventional navigation devices is reduced, the physical space for the optical elements and sensors for detecting the optical navigation input are also reduced.

For example, some conventional optical navigation device packages have a thickness, or optical height, of about 2.5 mm. The optical height refers to the distance from an optical finger interface surface to a corresponding sensor. The optical height is also referred to as the optical track. An optical height, or thickness, of about 2.5 mm is considered to be too thick for some implementations of handheld devices, such as cellular telephones and small portable PC peripherals. In conventional optical navigation devices which use optical lenses to direct the light from the optical finger interface surface to the corresponding sensor, it may be impractical to reduce the optical height below about 2.5 mm.

SUMMARY

Although the optical navigation module disclosed in the present application is shown and described with respect to certain embodiments, it is obvious that equivalents and modifications will occur to others skilled in the art upon the reading and understanding of the specification.

According to one aspect, there is provided an optical navigation module including a light transmission window, a light source located under the transmission window; a first light shield, a sensor located under the transmission window and a second light shield located between the light source and the sensor. The light transmission window includes a navigation surface, a first refraction surface on the top of the light source and a second refraction surface. The first light shield is configured for blocking ambient light. The second light shield is configured for blocking direct light from the light source to the sensor. The first refraction surface is used to refract the light towards the top navigation surface. The second refraction surface is used to guide the back-scattered light from the top navigation surface towards the sensor for sensing relative object movement.

In one embodiment, the light source is a top-emitting laser that emits a coherent optical radiation with a single lateral mode.

In one embodiment, the light source is a single-mode vertical cavity surface emitting laser.

In one embodiment, the light transmission window is fabricated using a material with refractive index between 1.5 and 1.8.

In one embodiment, the first refraction surface has an angle which is about 50 degrees.

In one embodiment, the second refraction surface has an angle which is in the range of about 60 degrees to about 80 degrees.

In one embodiment, the distance between the top surface of the light source and the top navigation surface is in the range of about 0.5 mm to about 1.0 mm.

In one embodiment, the sensor includes a photodiode array, the back-scattered light from the external moving object forms a speckle pattern on the photodiode array and the sensor detects the movement of the speckle pattern across the photodiode array to determine the relative movement of the object.

In one embodiment, the distance between the light source center to the near edge of photodiode array is between about 1.7 mm and about 2.3 mm.

In one embodiment, the first light shield and the light transmission window are molded into one single part.

In one embodiment, the first and second refraction surfaces are coated with anti-reflection coating.

In one embodiment, at least one of the first and second refraction surfaces contains a lens.

In one embodiment, the sensor is positioned in such an arrangement that receives the maximum back-scattered light by the object when the object is place on the top navigation surface and the back-scattered light reaching the photodiode array is reduced significantly when the external moving object is lifted off the top navigation surface.

In one embodiment, the optical navigation module further includes a PCB substrate, the sensor and the light source are electrically bonded onto the PCB substrate.

In one embodiment, the optical navigation module further includes a switch which is attached at the bottom side of the PCB substrate.

In one embodiment, the distance from the top navigation surface to the PCB substrate bottom is between about 1.2 mm and about 1.5 mm.

According to another aspect, there is provided an optical navigation module including a light source, a light transmission window, a first light shield, a sensor; and a second light shield located between the light source and the sensor. The first light shield is configured for blocking the ambient light. The sensor is configured for detecting light from the light transmission window. The second light shield is configured for blocking the direct light from the light source to the sensor. The light transmission window includes a navigation surface and at least one refraction surface. The refraction surface is positioned in the light path from the light source to the sensor.

In one embodiment, the refraction surface is positioned in the light path from the light source to the top navigation surface.

In one embodiment, the refraction surface is positioned in the light path from the top navigation surface to the sensor.

According to another aspect, there is provided a mobile electronic appliance including a optical navigation module. The optical navigation module includes a light source, a light transmission window, a first light shield, a sensor and a second light shield located between the light source and the sensor. The first light shield is configured for blocking the ambient light. The sensor is configured for detecting light from the light transmission window. The second light shield is configured for blocking the direct light from the light source to the sensor. The light transmission window includes a navigation surface and at least one refraction surface. The refraction surface is positioned in the light path from the light source to the sensor.

In one embodiment, the mobile electronic appliance includes an ultra-thin mobile phone, a laptop PC, or a tablet PC.

In one embodiment, the refraction surface is positioned in the light path from the light source to the top navigation surface.

In one embodiment, the refraction surface is positioned in the light path from the top navigation surface to the sensor.

In one embodiment, the light source is a top-emitting laser that emits a coherent optical radiation with a single lateral mode.

In one embodiment, the light source is a single-mode vertical cavity surface emitting laser.

In one embodiment, the light transmission window is fabricated using a material with refractive index between 1.5 and 1.8.

In one embodiment, the first refraction surface has an angle which is about 50 degrees.

In one embodiment, the second refraction surface has an angle which is in the range of about 60 degrees to about 80 degrees.

In one embodiment, the distance between the top surface of the light source and the top navigation surface is in the range of about 0.5 mm to about 1.0 mm.

In one embodiment, the sensor includes a photodiode array, the back-scattered light from the external moving object forms a speckle pattern on the photodiode array and the sensor detects the movement of the speckle pattern across the photodiode array to determine the relative movement of the object.

In one embodiment, the distance between the light source center to the near edge of photodiode array is between about 1.7 mm and about 2.3 mm.

In one embodiment, the first light shield and the light transmission window are molded into one single part.

In one embodiment, the first and second refraction surfaces are coated with anti-reflection coating.

In one embodiment, at least one of the first and second refraction surfaces contains a lens.

In one embodiment, the sensor is positioned in such an arrangement that receives the maximum back-scattered light by the object when the object is place on the top navigation surface and the back-scattered light reaching the photodiode array will be reduced significantly when the external moving object is lifted off the top navigation surface.

In one embodiment, the optical navigation module further includes a PCB substrate, the sensor and the light source are electrically bonded onto the PCB substrate.

In one embodiment, the optical navigation module further includes a switch which is attached at the bottom side of the PCB substrate.

In one embodiment, the distance from the top navigation surface to the PCB substrate bottom is between about 1.2 mm and about 1.5 mm.

DETAILED DESCRIPTION

Reference will now be made in detail to a preferred embodiment of the optical navigation module disclosed in the present application, examples of which are also provided in the following description. Exemplary embodiments of the optical navigation module disclosed in the present application are described in detail, although it will be apparent to those skilled in the relevant art that some features that are not particularly important to an understanding of the optical navigation module may not be shown for the sake of clarity.

Furthermore, it should be understood that the optical navigation module disclosed in the present application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of the disclosure.

Figure 1:
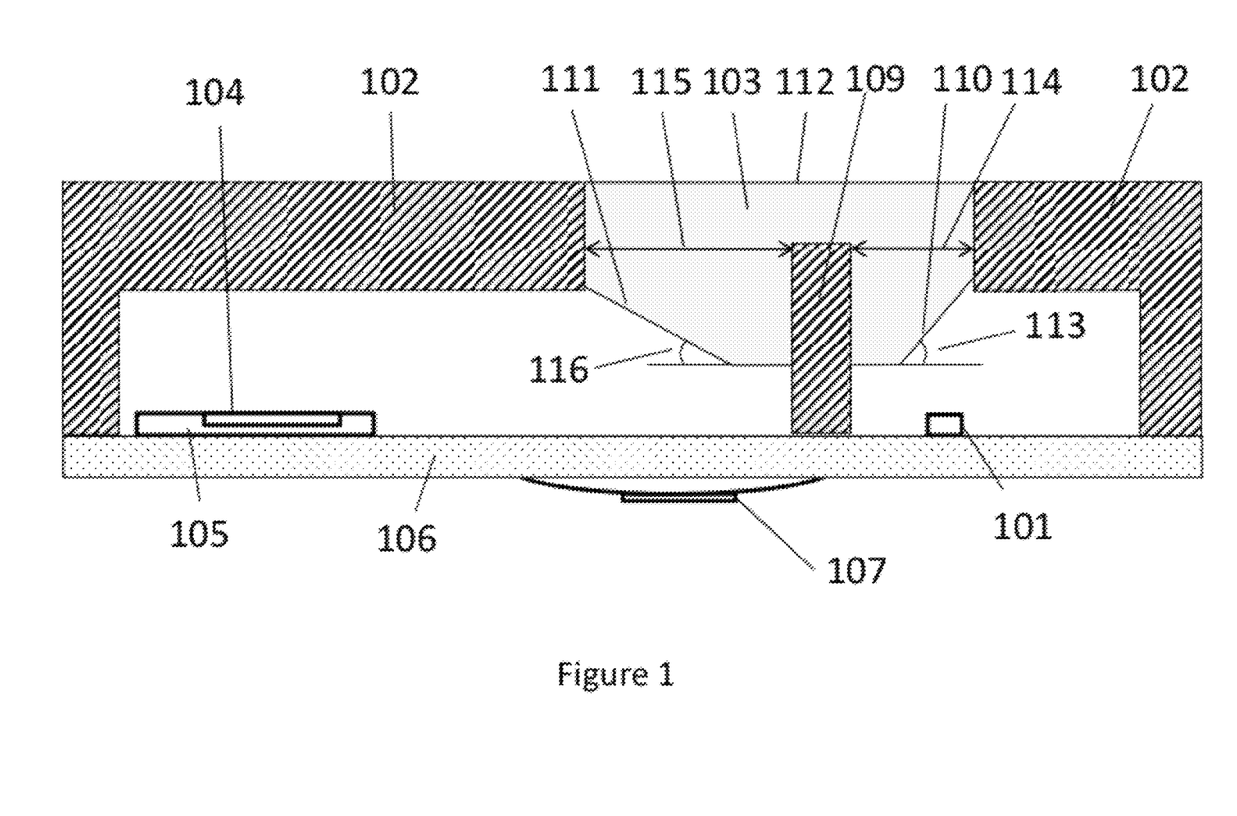
FIG. 1 is a cross sectional view of an optical navigation module according to an embodiment of this patent application.

FIG. 1 is a cross sectional view of an optical navigation module (ONM) of a first embodiment of this patent application. The optical navigation module includes a light source 101, a light transmission window 103, a first light shield 102, a second light shield 109, a sensor 105 and a printed circuit board (PCB) substrate 106. The light shield 102 and the transmission window 103 form the outer casing of the optical navigation module. The first light shield 102 and the second light shield 109 can be one piece by design and can be molded together with the light transmission window 103 using a two-shot injection molding. The sensor 105 and light source 101 are electrically bonded onto the PCB substrate 106. The sensor 105 can be a driver IC or other devices. The PCB substrate 106 can be a rigid PCB substrate.

The light source 101 may be an infrared light source. In this embodiment, the light source 101 is a top-emitting laser that emits coherent optical radiation with single lateral mode. More specifically, the light source 101 is a single-mode vertical cavity surface emitting laser. Other types of coherent light sources may be used as the light source 101.

The first light shield 102 is configured for blocking the ambient light and absorbing the scattered light. The second light shield 109 is located between the light source 101 and the sensor 105 and configured for blocking the direct light from the light source 101 to the sensor 105. Two cavities are formed underneath the first light shield 102 and separated by the second light shield 109. One cavity is configured for placing the light source 101 and the other cavity is configured for placing the sensor 105. There are a first aperture 114 and a second aperture 115 in the light transmission window 103 which provides an un-obstructed light path between the components in the cavities and the top surface of the optical navigation module.

The light transmission window 103 may be an infrared light transmission window. The light transmission window 103 can be made of a material that selectively transmits the wavelength of the light source 101 (typically around 850 nm) while blocking the other wavelengths. In this embodiment, the light transmission window 103 is fabricated using material with refractive index between 1.5 and 1.8. This material does not significantly attenuate the infrared light generated by the light source 101, but significantly absorbs the visible light.

The light transmission window 103 includes a top navigation surface 112, a first refraction surface 110 and a second refraction surface 111. The top navigation surface 112 can be the same height as the top surface of the first light shield 102.

The first refraction surface 110 is on the top of the light source 101 to refract the light towards the top navigation surface 112. The second refraction surface 111 is to guide the back-scattered light from the top navigation surface 112 towards the sensor 105 for sensing object's relative movement. The first refraction surfaces 110 and the second refraction surface 111 can optionally have an anti-reflection coating to reduce the Fresnel reflection loss on the surfaces.

Figure 2:
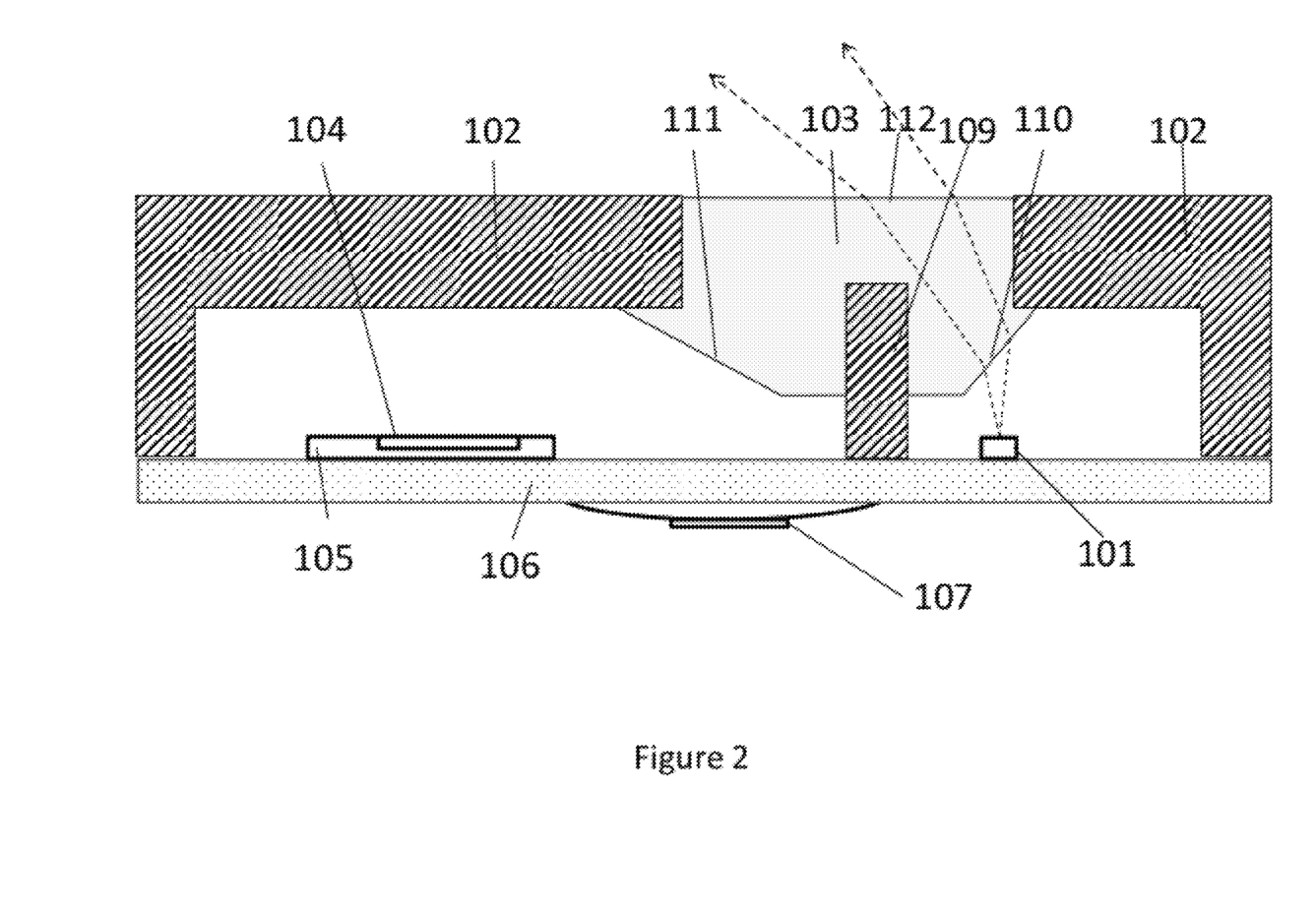
FIG. 2 illustrates the optical navigation module is not contacted by an object.

Referring to FIGS. 1 and 2, the light source 101 is placed directly underneath the first refraction surface 110. The first refraction surface 110 may has a first angle 113 which is in the range of 0 degree to about 90 degrees. In this embodiment, the first angle 113 of the first refraction surface 110 is about 50 degrees. The first refraction surface 110 is steered through the first aperture 114 towards the top navigation surface 112 due to the refraction occurred at the first refraction surface 110. The light (dotted lines in the drawings) reaches the top navigation surface 112 and exits the module when no object is present.

Figure 3:
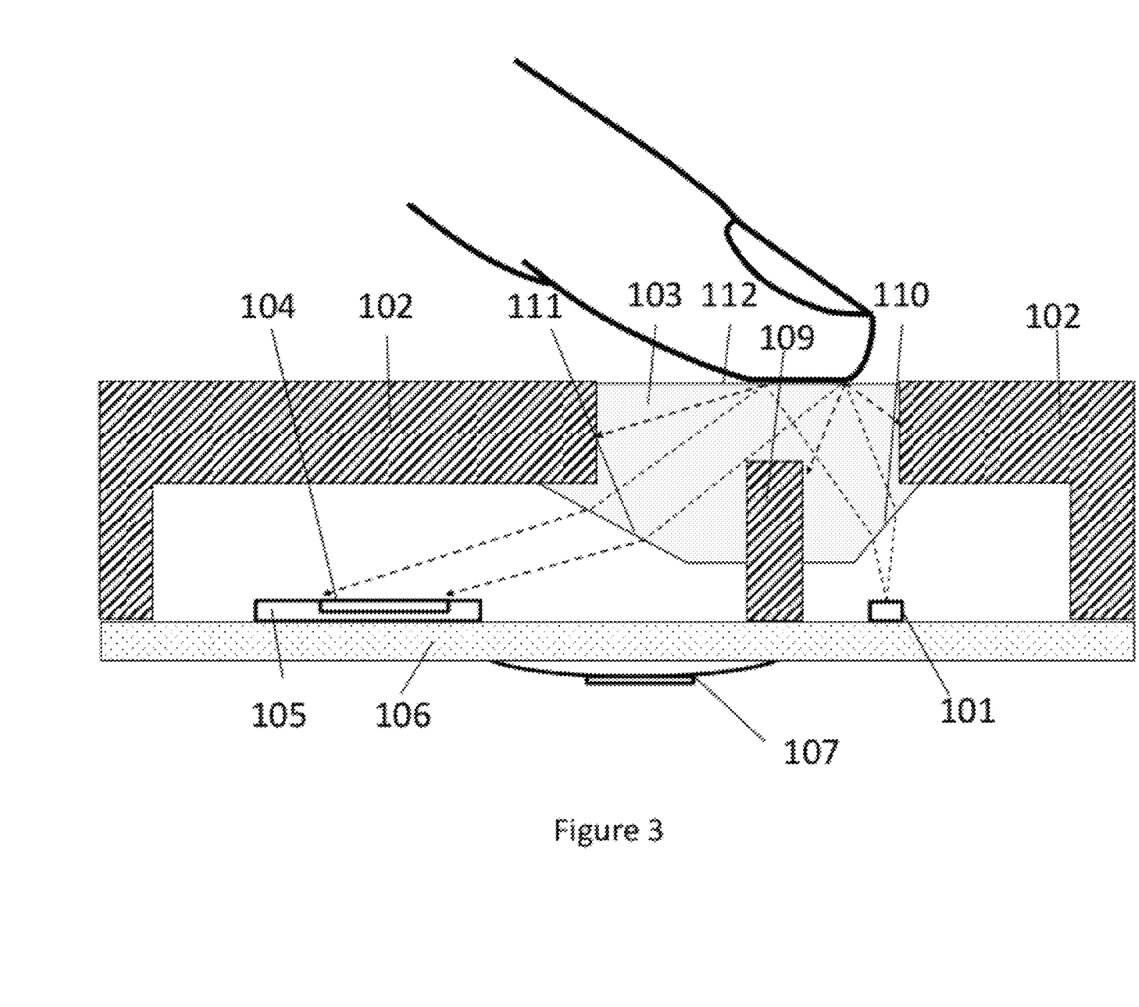
FIG. 3 illustrates the optical navigation module is contacted by an object.

Referring to FIGS. 1 and 3, with a moving object is placed in close proximity to the top navigation surface 112, the light is scattered by the surface of the object. Part of the scattered light, through the second aperture 115, reaches the second refraction surface 111 which has a second angle 116 which is between 0 degree and about 90 degrees. In this embodiment, the second angle 116 on the second refraction surface 111 is between about 60 degrees and about 80 degrees. Light is refracted again by the second refraction surface 111 and travel towards the sensor 105. The object is not a part of the optical navigation module. The object can be a human finger or the other moving object.

Referring to FIG. 1, the sensor 105 is configured for detecting the light from the light transmission window 103. The sensor 105 includes a photodiode (PD) array 104. The back-scattered light from the external moving object forms a speckle pattern with bright and dark patches on the photodiode array due to interference. Relative movement of the object across the top navigation surface 112 causes the speckle pattern to move across the PD array 104 surface. The sensor 105 detects and calculates the relative movement of the speckle pattern across the photodiode array by reading the photo current from the PD array 104.

Sensor 105 is placed at a location that it receives the maximum back-scattered light by the object when the object is place on the top navigation surface 112. When the external surface being tracked is lifted off the top navigation surface 112, the back-scattered light reaching the PD array 104 will be reduce significantly due to the blockage of light by the second aperture 115.

Figure 4:
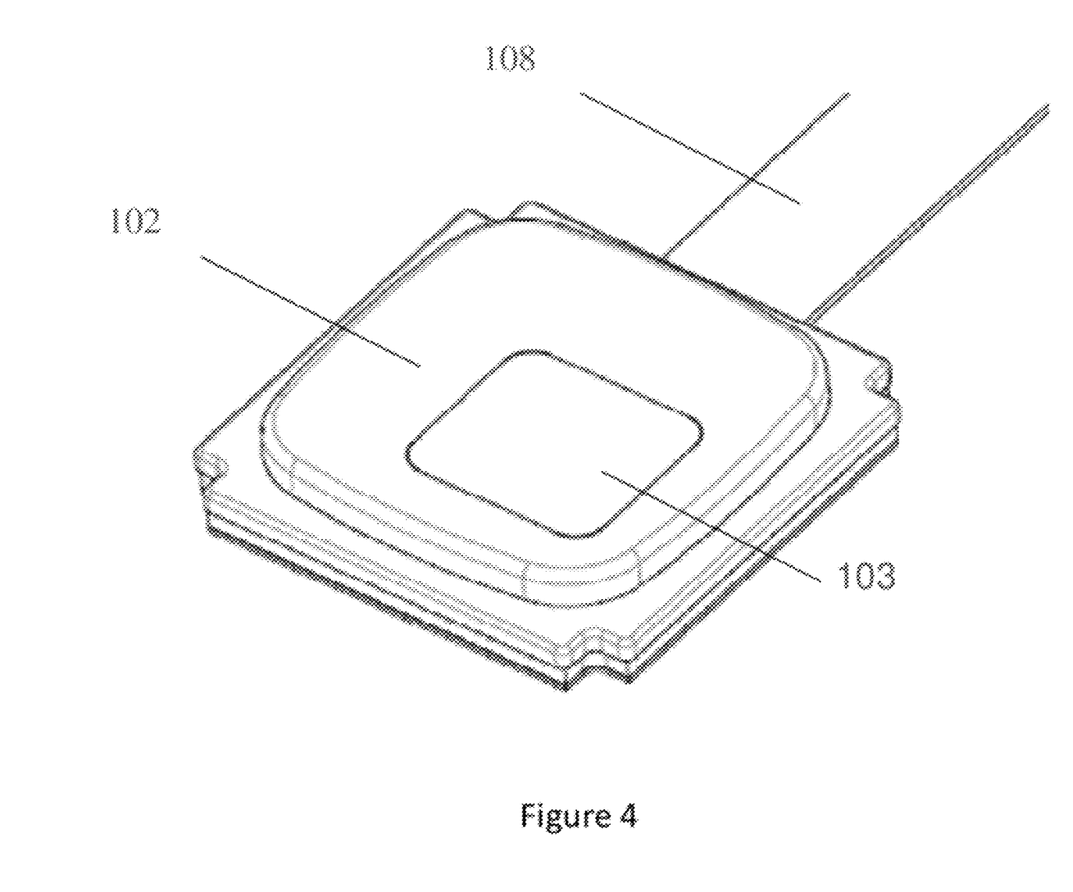
FIG. 4 is a perspective view of the optical navigation module.

Referring to FIG. 4, the movement information is converted to an electrical signal which can be accessed by an external system via Flexible Printed Circuit (FPC) 108 connection.

Referring to FIGS. 1-3, the optical navigation module can optionally have a tactile switch 107 attached to the bottom of the module to facilitate user's selection input by clicking on the optical navigation module.

Figure 5:
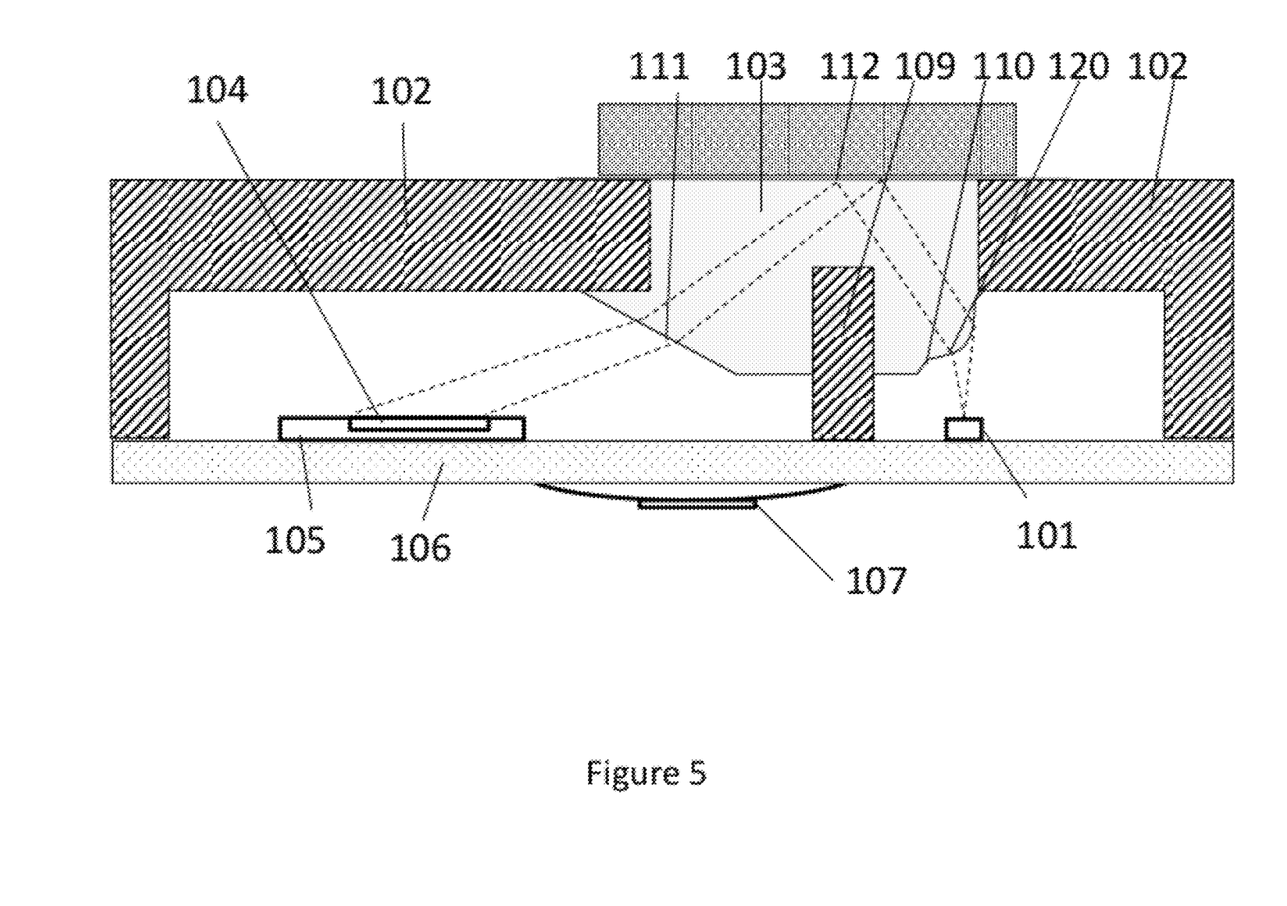
FIG. 5 is a cross sectional view of an optical navigation module according to a second embodiment of this patent application.

In one embodiment, the total thickness of the optical navigation module (from the top navigation surface 112 to the bottom of PCB substrate 106) is between about 1.2 mm and about 1.5 mm. The thickness from the top of the light source 101 to the top of the light transmission window 103 is between about 0.5 mm and about 1.0 mm. The distance between the light source 101 center and the near edge of PD array 104 is between about 1.7 mm and about 2.3 mm Referring to FIG. 5, the light transmission window 103 of the optical navigation module in this embodiment further includes a first lens 120. The first lens 120 is on the first refraction surface 110. The first lens 120 can transform the optical beam to a desirable size on the top navigation surface 112. The first lens 120 may be a micro lens array.

Figure 6:
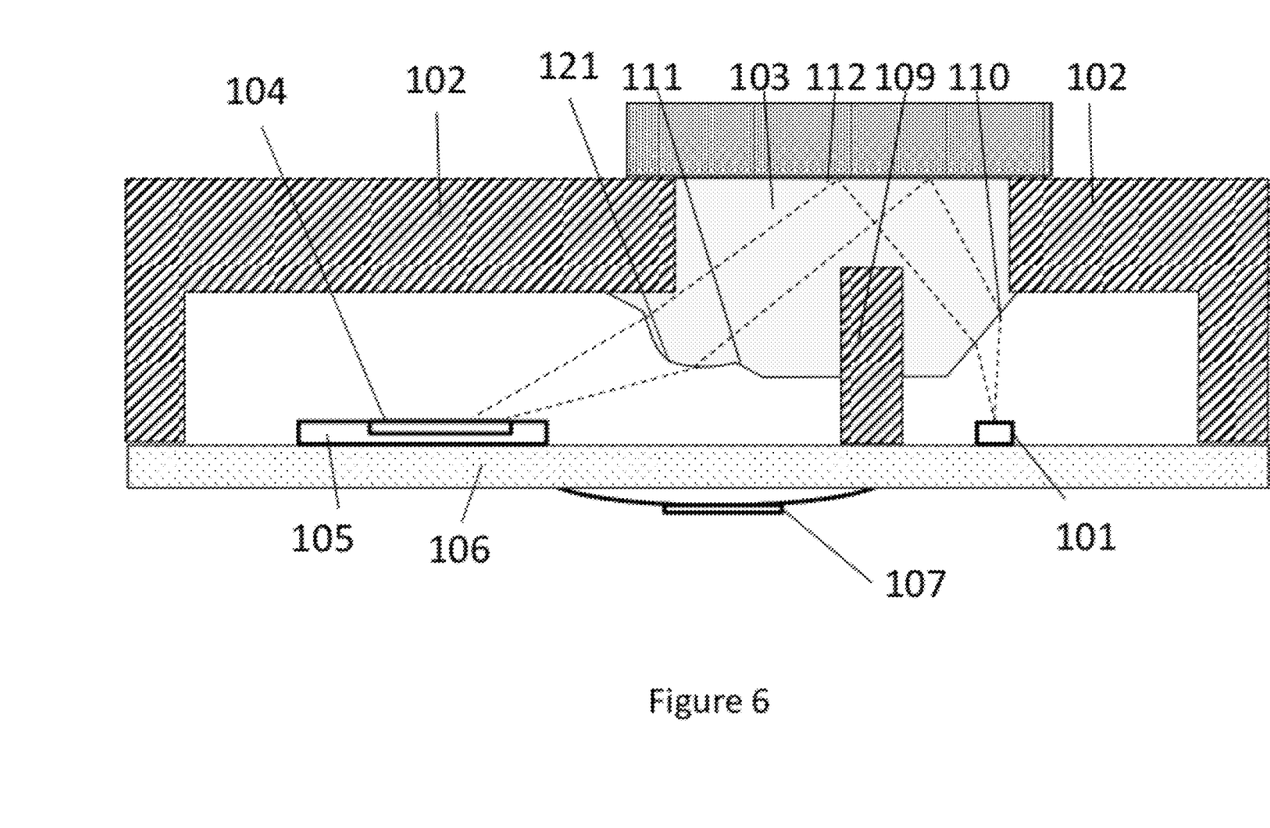
FIG. 6 is a cross sectional view of an optical navigation module according to a third embodiment of this patent application.

Referring to FIG. 6, the light transmission window 103 of the optical navigation module in this embodiment further includes a second lens 121. The second lens 121 is on the second refraction surface 111. The second lens 121 can improve light concentration on the PD array 104. The second lens 121 may be a micro lens array.

Figure 7:
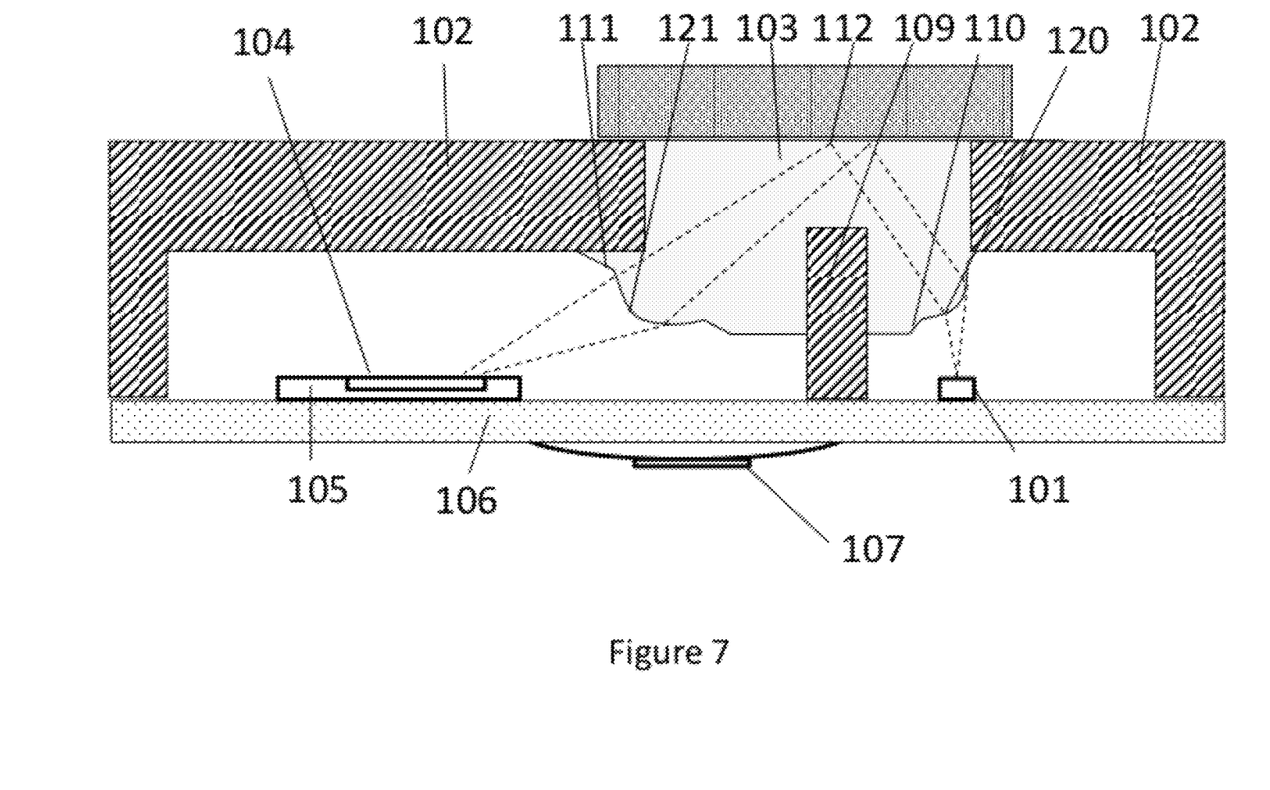
FIG. 7 is a cross sectional view of an optical navigation module according to a fourth embodiment of this patent application.

Referring to FIG. 7, the light transmission window 103 of the optical navigation module in this embodiment further includes a first lens 120 and a second lens 121. The first lens 120 is on the first refraction surface 110. The second lens 121 is on the second refraction surface 111. The first lens 120 can transform the optical beam to a desirable size on the top navigation surface 112. The second lens 121 can improve light concentration on the PD array 104.

Figure 8:
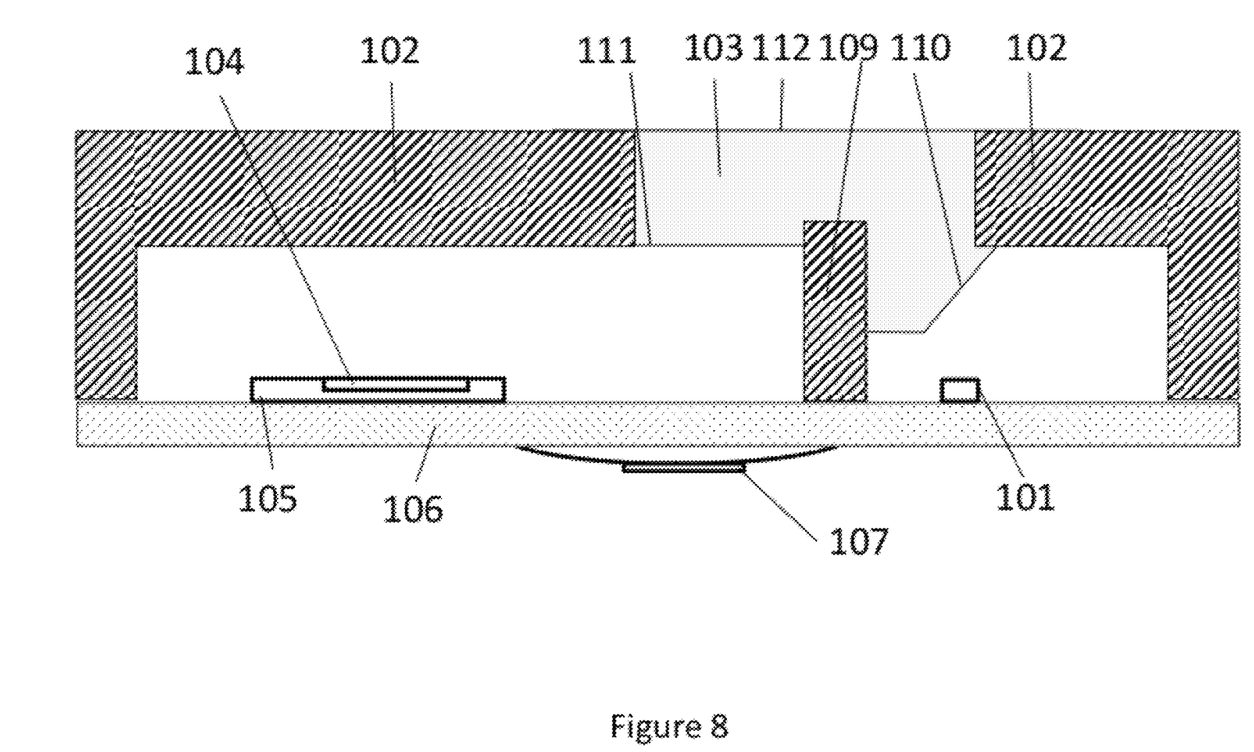
FIG. 8 is a cross sectional view of an optical navigation module according to a fifth embodiment of this patent application.
Figure 9:
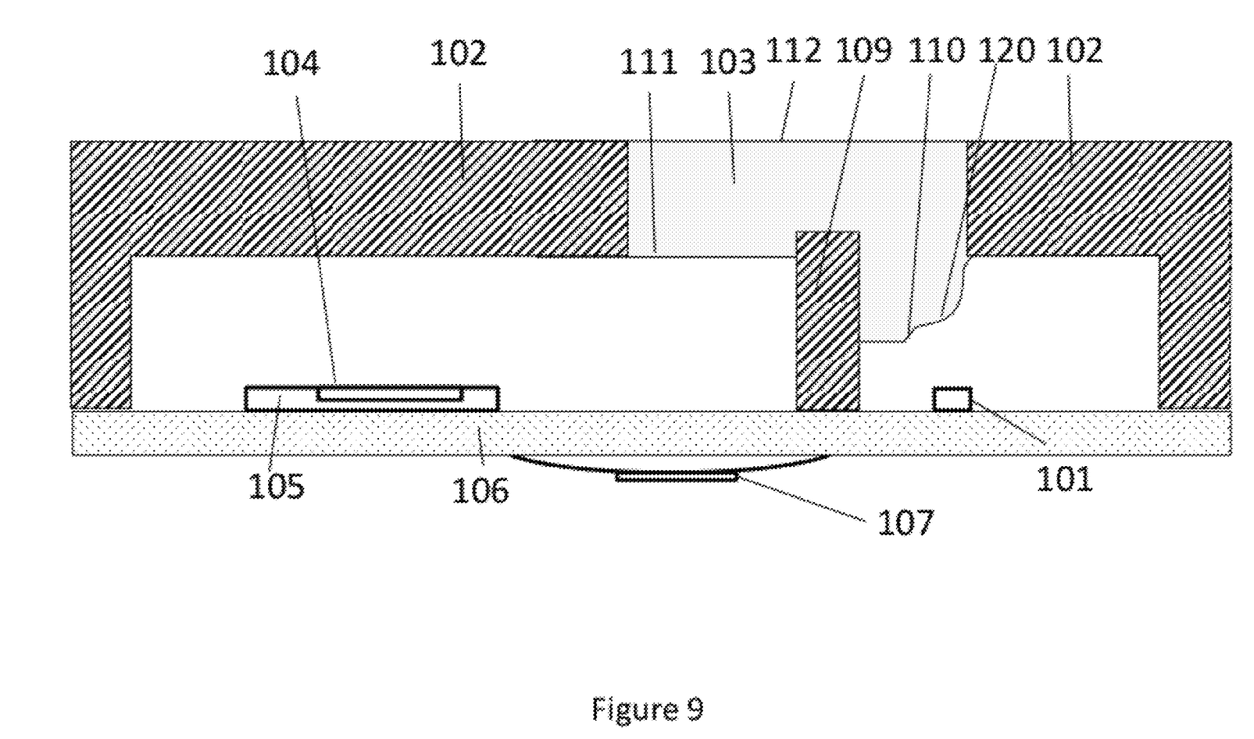
FIG. 9 is a cross sectional view of an optical navigation module according to a sixth embodiment of this patent application.

Referring to FIG. 8, the second refraction surface 111 in this embodiment is flat. The second refraction surface 111 has a second angle 116 which is 0 degree. The structure of this embodiment is very simple. Referring to FIG. 9, the light transmission window 103 of the optical navigation module in this embodiment further includes a first lens 120. The first lens 120 is on the first refraction surface 110. The first lens 120 can transform the optical beam to a desirable size on the top navigation surface 112.

Figure 10:
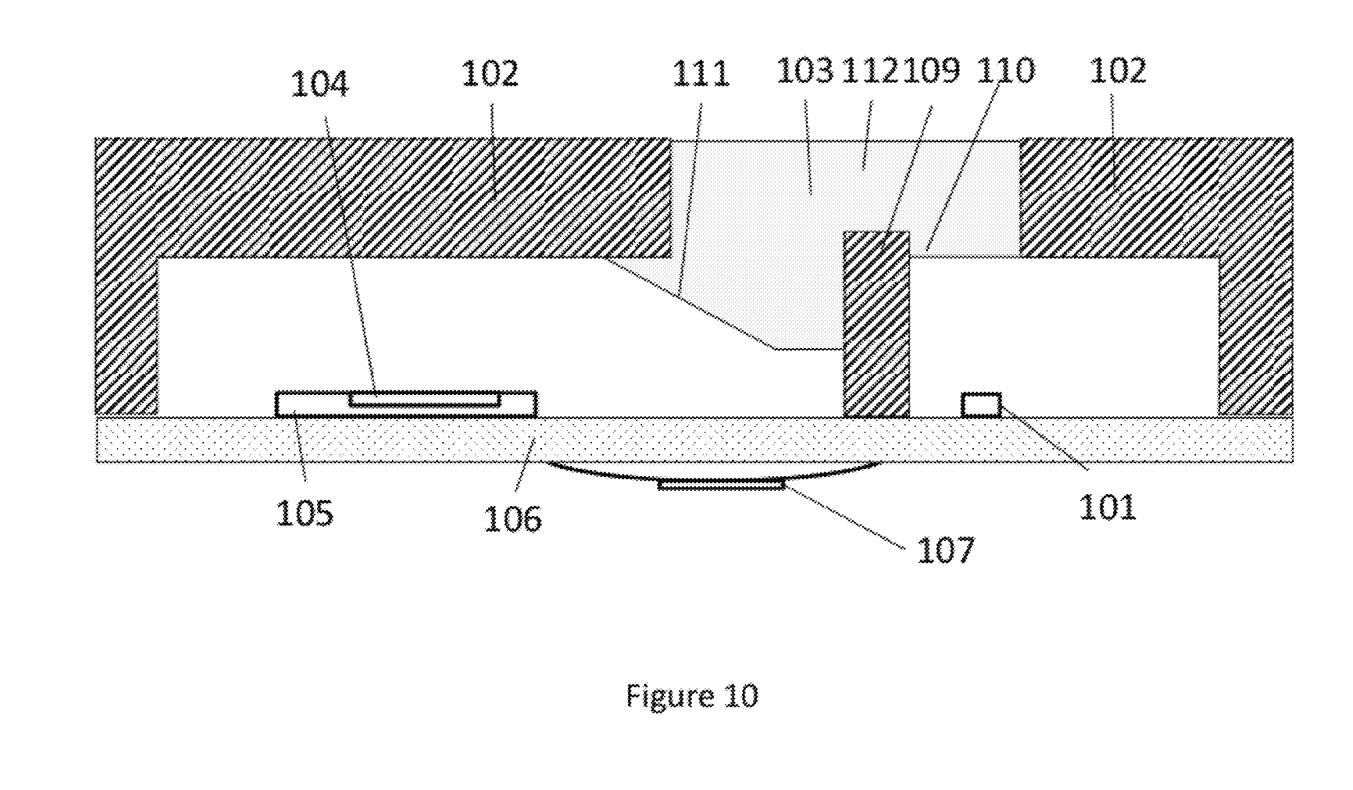
FIG. 10 is a cross sectional view of an optical navigation module according to a seventh embodiment of this patent application.
Figure 11:
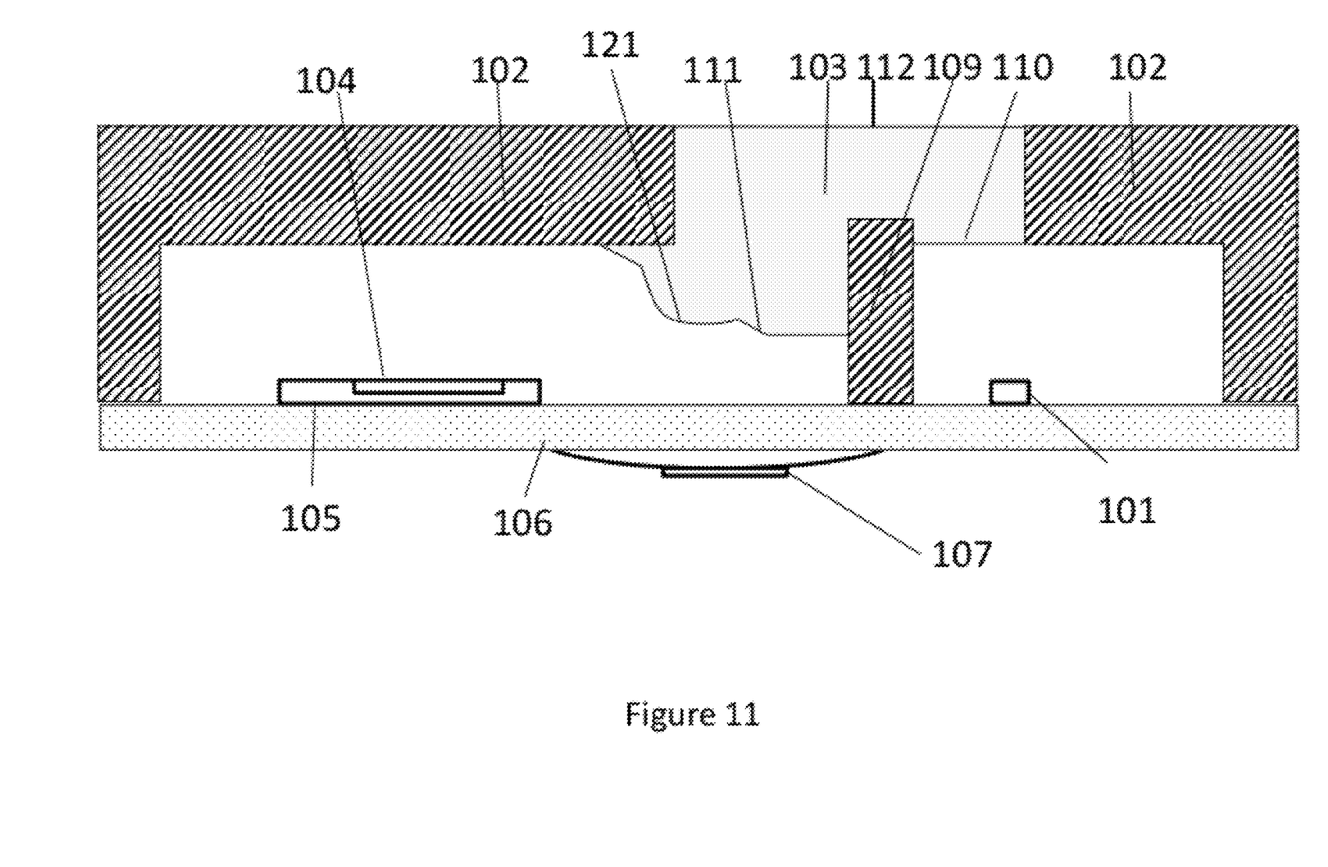
FIG. 11 is a cross sectional view of an optical navigation module according to an eighth embodiment of this patent application.

Referring to FIG. 10, the first refraction surface 110 in this embodiment is flat. The first refraction surface 110 has a first angle 113 which is 0 degree. The structure of this embodiment is very simple. Referring to FIG. 11, the light transmission window 103 of the optical navigation module in this embodiment further includes a second lens 121. The second lens 121 is on the second refraction surface 111. The second lens 121 can improve light concentration on the PD array 104.

In this patent application, a refraction structure is used to shorten the round-trip light path thus reducing the height of the module. The optical navigation module utilizes a refraction-based optical structure and the minimum number of optical surfaces to reduce the height of the navigation module to less than about 1.5 mm. The optical height can be reduced to less than about 0.9 mm. The navigation module can still maintain a large effective illumination area for navigation sensor to work.

The optical navigation module in this patent application can be used in some mobile electronic appliance, such as an ultra-thin mobile phone, a laptop PC, a tablet PC and any other consumer electronics requiring user input through a graphical user interface (GUI).

While the optical navigation module and the mobile electronic appliance disclosed in the present application has been shown and described with particular references to a number of preferred embodiments thereof, it should be noted that various other changes or modifications may be made without departing from the scope of the appending claims.

What is claimed is:

1. An optical navigation module comprising:
a light transmission window comprising a navigation surface;
a light source located under the transmission window;
a first light shield configured for blocking ambient light;
a sensor located under the transmission window;
a second light shield located between the light source and the sensor and configured for blocking direct light from the light source to the sensor;
wherein the light transmission window comprises a first refraction surface on the top of the light source to refract the light and change a direction of the light towards the top navigation surface and a second refraction surface to refract back-scattered light, change a direction of the back-scattered light and guide the back-scattered light from the top navigation surface towards the sensor for sensing relative object movement;
wherein the light transmission window further comprises a top navigation surface, a first lens and a second lens; the top navigation surface is the same height as a top surface of the first light shield; the first lens is on the first refraction surface, the first lens transforms the light from the light source to a desirable size; the second lens is on the second refraction surface; two cavities are formed underneath the first light shield and separated by the second light shield; and the sensor and the light source are placed in the two cavities respectively; wherein a top part of the second light shield is inserted into the light transmission window; a top surface of the second light shield is lower than the top surface of the first light shield, and the top surface of the second light shield is higher than a bottom surface of the light transmission window and is higher than a bottom surface of the first light shield; and
wherein the first light shield and the second light shield are molded together with the light transmission window.

2. The optical navigation module of claim 1, wherein the light source is a top-emitting laser that emits a coherent optical radiation with a single lateral mode or the light source is a single-mode vertical cavity surface emitting laser.

3. The optical navigation module of claim 1, wherein the light transmission window is fabricated using a material with refractive index between 1.5 and 1.8.

4. The optical navigation module of claim 1, wherein the first refraction surface has an angle which is about 50 degrees.

5. The optical navigation module of claim 1, wherein the second refraction surface has an angle which is in the range of about 60 degrees to about 80 degrees.

6. The optical navigation module of claim 1, wherein the distance between the top surface of the light source and the top navigation surface is in the range of about 0.5 mm to about 1.0 mm.

7. The optical navigation module of claim 1, wherein the sensor comprises a photodiode array, the back-scattered light from the external moving object forms a speckle pattern on the photodiode array and the sensor detects the movement of the speckle pattern across the photodiode array to determine the relative movement of the object.

8. The optical navigation module of claim 7, wherein the distance between the light source center to the near edge of photodiode array is between about 1.7 mm and about 2.3 mm.

9. The optical navigation module of claim 7, wherein the sensor is positioned in such an arrangement that receives the maximum back-scattered light by the object when the object is placed on the top navigation surface and the back-scattered light reaching the photodiode array is reduced significantly when the external moving object is lifted off the top navigation surface.

10. The optical navigation module of claim 1, wherein the first and second refraction surfaces are coated with anti-reflection coating.

11. The optical navigation module of claim 1 further comprises a PCB substrate, the sensor and the light source are electrically bonded onto the PCB substrate.

12. The optical navigation module of claim 11 further comprises a switch which is attached at the bottom side of the PCB substrate.

13. The optical navigation module of claim 11, wherein the distance from the top navigation surface to the PCB substrate bottom is between about 1.2 mm and about 1.5 mm.

14. The optical navigation module of claim 1, wherein the sensor is located at a lower lateral of the light transmission window which is not directly under the light transmission window.

15. An optical navigation module comprising:
a light source;
a light transmission window comprising a navigation surface;
a first light shield configured for blocking the ambient light;
a sensor configured for detecting light from the light transmission window;
a second light shield located between the light source and the sensor and configured for blocking the direct light from the light source to the sensor;
wherein the light transmission window comprises at least one refraction surface, the refraction surface is positioned in the light path from the light source to the sensor and changes a direction of the light; two cavities are formed underneath the first light shield and separated by the second light shield; and the sensor and the light source are placed in the two cavities respectively; and
wherein a top part of the second light shield is inserted into the light transmission window; the top surface of the second light shield is lower than the top surface of the first light shield, and the top surface of the second light shield is higher than the bottom surface of the light transmission window and is higher than a bottom surface of the first light shield.

16. The optical navigation module of claim 15, wherein the refraction surface is positioned in the light path from the light source to the top navigation surface.

17. The optical navigation module of claim 15, wherein the refraction surface is positioned in the light path from the top navigation surface to the sensor.

18. A mobile electronic appliance comprising the optical navigation module of claim 15.

19. The mobile electronic appliance of claim 18, wherein the optical navigation module further comprises a PCB substrate, the sensor and the light source are electrically bonded onto the PCB substrate.

20. The mobile electronic appliance of claim 19, wherein the optical navigation module further comprises a switch which is attached at the bottom side of the PCB substrate.

21. The mobile electronic appliance of claim 19 wherein the distance from the top navigation surface to the PCB substrate bottom is between about 1.2 mm and about 1.5 mm.

22. The mobile electronic appliance of claim 18, wherein the mobile electronic appliance comprises an ultra-thin mobile phone, a laptop PC, or a tablet PC.

23. The mobile electronic appliance of claim 18, wherein the refraction surface is positioned in the light path from the light source to the top navigation surface.

24. The mobile electronic appliance of claim 18, wherein the refraction surface is positioned in the light path from the top navigation surface to the sensor.

25. The mobile electronic appliance of claim 18, wherein the light source is a top-emitting laser that emits a coherent optical radiation with a single lateral mode.

26. The mobile electronic appliance of claim 18, wherein the light source is a single-mode vertical cavity surface emitting laser.

27. The mobile electronic appliance of claim 18, wherein the light transmission window is fabricated using a material with refractive index between 1.5 and 1.8.

28. The mobile electronic appliance of claim 18, wherein the first refraction surface has an angle which is about 50 degrees.

29. The mobile electronic appliance of claim 18, wherein the second refraction surface has an angle which is in the range of about 60 degrees to about 80 degrees.

30. The mobile electronic appliance of claim 18, wherein the distance between the top surface of the light source and the top navigation surface is in the range of about 0.5 mm to about 1.0 mm.

31. The mobile electronic appliance of claim 18, wherein the sensor comprises a photodiode array, the back-scattered light from the external moving object forms a speckle pattern on the photodiode array and the sensor detects the movement of the speckle pattern across the photodiode array to determine the relative movement of the object.

32. The mobile electronic appliance of claim 31, wherein the distance between the light source center to the near edge of photodiode array is between about 1.7 mm and about 2.3 mm.

33. The mobile electronic appliance of claim 31, wherein the sensor is positioned in such an arrangement that receives the maximum back-scattered light by the object when the object is place on the top navigation surface and the back-scattered light reaching the photodiode array will be reduced significantly when the external moving object is lifted off the top navigation surface.

34. The mobile electronic appliance of claim 18, wherein the first light shield and the light transmission window are molded into one single part.

35. The mobile electronic appliance of claim 18, wherein the first and second refraction surfaces are coated with anti-reflection coating.

36. The mobile electronic appliance of claim 18, wherein at least one of the first and second refraction surfaces contains a lens.

37. The mobile electronic appliance of claim 18, wherein the light transmission window further comprises a top navigation surface, and the top navigation surface is the same height as a top surface of the first light shield.

38. The mobile electronic appliance of claim 18, wherein the light transmission window further comprises a first lens which is on the refraction surface, and the first lens transforms the light from the light source to a desirable size.

39. The optical navigation module of claim 15, wherein the sensor is located at a lower lateral of the light transmission window which is not directly under the light transmission window.

\* \* \* \* \*